United States Patent

Arkhipkin et al.

[11] Patent Number: 6,018,547
[45] Date of Patent: Jan. 25, 2000

[54] METHOD AND APPARATUS FOR INCREASING SPECTRAL EFFICIENCY OF CDMA SYSTEMS USING DIRECT SEQUENCE SPREAD SPECTRUM SIGNALS

[75] Inventors: Vladimir J. Arkhipkin; Konstantin A. Meshkovsky, both of Moscow, Russian Federation; Franklin S. Miller, Summit, N.J.; Alexander G. Sokolov, Moscow, Russian Federation

[73] Assignee: BSD Broadband, N.V., Russian Federation

[21] Appl. No.: 09/004,799

[22] Filed: Jan. 9, 1998

[51] Int. Cl.[7] ............................................. H04B 1/69
[52] U.S. Cl. ........................ 375/208; 375/206; 370/335; 370/468
[58] Field of Search .................................. 375/200, 206, 375/208, 259, 265, 295, 316; 370/342, 441, 208, 203, 535, 335, 465, 468

[56] References Cited

U.S. PATENT DOCUMENTS

| | | |
|---|---|---|
| 4,862,478 | 8/1989 | McIntosh . |
| 4,930,140 | 5/1990 | Cripps et al. . |
| 4,964,138 | 10/1990 | Nease et al. . |
| 5,048,052 | 9/1991 | Hamatsu et al. . |
| 5,127,021 | 6/1992 | Schreiber . |
| 5,268,926 | 12/1993 | Sebilet . |
| 5,309,474 | 5/1994 | Gilhousen et al. . |
| 5,412,687 | 5/1995 | Sutton et al. . |
| 5,414,728 | 5/1995 | Zehavi . |

(List continued on next page.)

OTHER PUBLICATIONS

Zhang et al., "Novel Trellis–Coded Sequence and Phase Modulation for DS/SS System," Electronic Letters, May 1994, vol. 30, No. 11, pp. 835–836.

(List continued on next page.)

*Primary Examiner*—Temesghen Ghebretinsae
*Assistant Examiner*—Lenny Jiang
*Attorney, Agent, or Firm*—Baker & Botts, L.L.P.

[57] ABSTRACT

An improved modulator and demodulator for use in a spread spectrum system. The modulator can process two data channels (I and Q) at nominal data rate or one high speed channel demultiplexed into two nominal rate data channels. The modulator includes one pseudorandom noise (PN) sequence generator that generates two orthogonal PN sequences. The two PN sequences are provided to a switch. Each channel includes a demultiplexer, one output of which controls which PN sequence is provided by the switch. The other demultiplexer output is then modulo-2 added (exclusive-OR'd) with the chosen PN sequence, and the modulo-2 sum is provided to the rest of the transmitter. The demodulator processes the two I and Q channels and includes a PN sequence generator providing replicas of the two PN sequences. Each channel is divided into subchannels, each subchannel being multiplied by one of the PN sequences and the results integrated. A channel decision circuit compares the two integrated results and chooses the subchannel with the largest integrator result magnitude. The channel decision circuit provides to a multiplexer a control signal based on which subchannel integrator result was greater. Decision circuits in each subchannel determine whether the bits in each subchannel are high or low and provides this signal to the inputs of a switch. The switch outputs the bit from the subchannel with the greater integrator result. The multiplexer combines the switch output and the control signal and outputs a signal at the nominal data rate. If there was one high speed input, the outputs of the two channels can be multiplexed into one high speed output. Such an apparatus and method improves over the prior art by doubling spectral efficiency, thus increasing the number of users or the data rate with no increase in bandwidth used.

11 Claims, 9 Drawing Sheets

U.S. PATENT DOCUMENTS

| | | |
|---|---|---|
| 5,506,862 | 4/1996 | McIntosh . |
| 5,515,396 | 5/1996 | Dalekotzin . |
| 5,544,196 | 8/1996 | Tiedemann, Jr. et al. .............. 375/200 |
| 5,608,722 | 3/1997 | Miller . |
| 5,623,485 | 4/1997 | Bi ........................................... 370/209 |
| 5,812,543 | 9/1998 | Sugita ..................................... 370/335 |
| 5,856,997 | 1/1999 | Mochizuki et al. .................... 375/200 |
| 5,862,172 | 1/1999 | Sugita et al. ........................... 375/200 |
| 5,903,555 | 5/1999 | Wildauer et al. ....................... 370/342 |

OTHER PUBLICATIONS

Robert C. Dixon, *Spread Spectrum Systems with Commercial Applications* (3d ed. 1994), pp. 60–70, 91–93.

George C. Clark, Jr., and J. Bibb Cain, *Error–Correction Coding for Digital Communications* (1981), pp. 2–17, 332–332–333, 345–349, 366–375.

Jack K. Holmes, *Coherent Spread Spectrum Systems* (1982), pp. 1–3, 304–309, 344–349, 395–397, 467–471.

Jerry D. Gibson, *Digital and Analog Communications* (2d ed. 1993), pp. 405–436.

METHOD AND APPARATUS FOR INCREASING SPECTRAL EFFICIENCY OF CDMA SYSTEMS USING DIRECT SEQUENCE SPREAD SPECTRUM SIGNALS

BACKGROUND OF INVENTION

1. Field of the Invention

The present invention relates to broadband communication systems and particularly to systems for transmission and reception of pseudorandom noise sequences and spread spectrum signals, and to code division multiple access systems with application to satellite and terrestrial communications.

2. Description of the Related Art

Spread spectrum systems have been used for many years in digital communications. A spread spectrum signal consists of a baseband message signal modulated onto a carrier and thereafter spread in frequency by a pseudorandom noise sequence ("PN sequence" or "PNS"), independent of the message signal itself. The receiver then recovers the message signal by using a replica of the PN sequence. The main advantages of spread spectrum systems are good interference and noise rejection, low power density, ability to access multiple channels (such as in code division multiple access (CDMA) systems), high resolution ranging, and message protection. The ratio of the bandwidth of the PNS to that of the message signal, called the processing gain, determines the merit of the system.

Typical block diagrams of a spread spectrum transmitter and receiver are found in J. K. Holmes, *Coherent Spread Spectrum Systems* (Wiley 1982), and reproduced as FIGS. 1a and 1b. In the transmitter in FIG. 1a, a digital message signal transmitted at bit rate B is provided to coder 104. This coder encodes the data bits into codewords for transmission and can be a block coder or a convolutional coder as described in G. C. Clark and J. B. Cain, *Error-Correction Coding for Digital Communications* (Plenum Press 1981). PNS modulator 106 modulates (or spreads) the coded signal with a PN sequence from PNS generator 110. Carrier frequency generator 112 generates a carrier signal that is modulated by the spread coded signal in carrier modulator 108. The PN sequence is a digital signal made up of "chips" and whose chip interval or chip period is much smaller than the data bit period (thus the bandwidth of the PN sequence is much greater than that of the data signal). The resulting signal is amplified by amplifier 120 and transmitted by antenna 130.

As depicted in FIG. 1b, the transmitted signal is received by antenna 150 and amplified by amplifier 160. The received signal is provided to carrier restoration and phasing module 166 which provides a local oscillator signal which is phase synchronized to the carrier signal. The local oscillator signal is used to demodulate the carrier from the received signal in coherent detector 162. The resulting demodulated signal is provided to tracking and acquisition (T&A) synchronism device 168 to establish synchronization between the demodulated signal and a local PNS generator in T&A synchronism device 168 which generates a replica of the PNS that was used in the transmitter. In the acquisition stage, a coarse alignment between the replicated PNS and the demodulated signal is performed using serial and/or sequential search, sequential estimation, universal timing, or matched filter algorithms. These techniques are described in various references, one of which is R. C. Dixon, *Spread Spectrum Systems with Commercial Applications* (Wiley 1994). The acquisition stage brings the replicated PNS and the demodulated signal within half a chip interval of each other. Once the demodulated signal is acquired, the two signals are tracked, generally using a delay-lock loop. See, e.g., J. J. Spilker, *Digital Communications by Satellite* (Prentice Hall 1977). Once synchronized, T&A synchronism device 168 outputs the synchronized replicated PNS to PNS demodulator 164 which further demodulates (despreads) the modulated signal to produce a baseband coded data signal which is provided to decoder 170. Decoder 170 contains circuitry to extract the clock signal, to determine whether code bits are high or low, to synchronize the code frames, and to convert coded bits into message data bits.

A two-channel version of this spread spectrum system is described in U.S. Pat. No. 5,414,728 to Zehavi, and depicted in FIGS. 2a–2c. In the transmitter of FIG. 2a, two message signals, User A and User B, are transmitted at bit rate B in I (in-phase) and Q (quadrature phase) channels, respectively, or a single user at bit rate 2B is demultiplexed in demultiplexer 202 and transmitted in the I and Q channels. The two signals are then respectively supplied to I and Q channel coders 204a and 204b. Each channel is spread by a separate PN sequence, the I-channel by $PNS_I$ generated by $PNS_I$ generator 210a, and the Q-channel by $PNS_Q$ generated by $PNS_Q$ generator 210b. In PNS modulators 206a and 206b, the coded signals modulate the respective PNS, the result being provided to I-channel carrier modulator 208a and Q-channel carrier modulator 208b, respectively. An in-phase carrier signal produced by carrier frequency generator 212 is modulated (usually by binary phase shift keying or BPSK) in I-channel carrier modulator 208a by the spread coded signal to produce an I-channel signal that is provided to summing amplifier 220. The in-phase carrier signal is phase shifted by 90° in phase shifter 214 and then BPSK-modulated in Q-channel carrier modulator 208b by the spread coded signal to produce a Q-channel signal which is added to the I-channel signal in summing amplifier 220 and provided to antenna 230 for transmission.

The receiver of FIG. 2b processes the two channels, receiving the transmitted signal in antenna 250 and amplifying it in amplifier 260. As before with the single channel system depicted in FIG. 1b, the carrier signal is restored in carrier frequency restoration and phasing module 266. Carrier restoration module 266 provides in-phase and quadrature-phase carrier signals which are used to demodulate the received signal in coherent detector 262 into received I and Q component signals. Each of these is used in T&A synchronism device 268 to acquire and track the received signals and to produce a timing signal which is provided to $PNS_I$ generator 265a, and $PNS_Q$ generator 265b. $PNS_I$ generator 265a replicates $PNS_I$ to despread the received I-channel signal, and $PNS_Q$ generator 265b replicates $PNS_Q$ to despread the received Q-channel signal. In PNS demodulator 264, shown in more detail in FIG. 2c, each channel is split into subchannels. One subchannel from each channel is then multiplied with $PNS_I$ in multipliers 284a and 284b, and the other subchannel is multiplied with $PNS_Q$ in multipliers 282a and 282b. The four products are accumulated in accumulators 286a,286b,288a, and 288b for one PNS period (illustrated by switches 290a,290b,292a, and 292b and delay elements 294a,294b,296a, and 296b). The accumulated results from the subchannels in the I and Q channels that were multiplied by $PNS_I$ are provided to phase rotator 298a, and the integrated results of the subchannels in the I and Q channels that were multiplied by $PNS_Q$ are provided to phase rotator 298b. These phase rotators estimate the data sequences that were transmitted in each channel.

This prior art system is limited in its spectral efficiency, thus limiting the number of users or the data rate of the system or both. Spectral efficiency is defined by $$\gamma = \frac{2B_m N}{\Delta F},$$

where $B_m$ is the data rate of the information signal that modulates the PN sequences, $\Delta F$ is the occupying frequency range, and N is the number of subscriber stations (information streams) working within the same frequency range at the same time. In orthogonal CDMA (OCDMA), it is necessary to allocate for each subscriber station two PN sequences, each sequence being of signal base (length) D. Thus, $$N = \frac{D}{2} \text{ where } D = \frac{\Delta F}{B_m}; \text{ therefore } N = \frac{\Delta F}{2B_m}.$$

In this prior art system, $B_m = B$, the data rate of the information signal provided to PNS modulators 206a and 206b in FIG. 2a. Substituting into the spectral efficiency equation, $$\gamma = \left(\frac{2B}{\Delta F}\right) \cdot \left(\frac{\Delta F}{2B}\right)$$

and $\gamma = 1$ bit/sec/Hz. It is an object of the present invention to double the spectral efficiency of a spread spectrum system by decreasing the bit rate of the information signal provided to the PNS modulator and by using two PN sequences on both the I and Q channels.

SUMMARY OF THE INVENTION

The improved spread spectrum system includes a modulator and demodulator for use in a spread spectrum system operating at nominal data rate B. The modulator, which can be a spreader or an encoder, processes I and Q channels and includes a PN sequence generator that generates two orthogonal PN sequences. Each channel includes a demultiplexer, a switch, and a modulo-2 adder. In each channel, the data signal is demultiplexed into two data signals operating at half the nominal data rate. One demultiplexed signal is sent to the trigger of the switch, determining which of the two PN sequences the switch outputs, depending on whether the demultiplexed signal is high or low. The other demultiplexed signal is modulo-2 added (exclusive-OR'd) to the PNS provided by the switch, and the modulo-2 sum is transmitted as the channel output. The modulator can process two data channels at bit rate B or one high speed channel at bit rate 2B that is demultiplexed into two nominal rate data channels.

The demodulator, which can be a despreader or a decoder, processes I and Q channels and includes a PN sequence generator that generates replicas of the PN sequences that were used in the modulator. Each channel is divided into two subchannels, each subchannel including a multiplier, an integrator, and a decision circuit. Each channel also includes a channel decision circuit, a switch, and a multiplexer. The received data signal is split into the two subchannels, one branch being multiplied by the first PNS and the other branch multiplied by the second PNS. The multiplier outputs are integrated and provided to the subchannel decision circuit to determine whether the bit is high or low. The absolute values of the integrated results are also compared in the channel decision circuit which provides a trigger signal and a control signal. The control signal is high or low depending on which subchannel had the higher integrated result (i.e. control signal is high if the subchannel multiplied by the first PNS had a greater integrated result; control signal is low otherwise). The trigger signal triggers the switch to pass the data bit from the subchannel whose integrated result was greater. The switch output and the control signal, both operating at half the nominal data rate, are multiplexed and the combined output is the channel output at the nominal data rate. If there is a single, high-speed user, the two channel outputs are multiplexed to provide a single output at twice the nominal data rate.

This invention doubles the spectral efficiency as compared with that of the prior art. As before, $$N = \frac{D}{2} \text{ where } D = \frac{\Delta F}{B_m}.$$

However, the bit rate $B_m$ in the denominator of this equation is the bit rate of the data that modulates the PN sequences, i.e. B/2 in the present invention. Thus, $$D = \frac{\Delta F}{\frac{B}{2}} = \frac{2\Delta F}{B}, N = \frac{2\Delta F}{2B} = \frac{\Delta F}{B}, \text{ and } \gamma = \left(\frac{2B}{\Delta F}\right) \cdot \left(\frac{\Delta F}{B}\right)$$

and $\gamma = 2$ bit/sec/Hz. The increase in $\gamma$ means that the system capacity is higher within the specific frequency band. This higher capacity can be realized with higher data rates, more users, or a combination according to the equation $B_T = B_U \cdot U$, where $B_T$ is the capacity of the whole system, $B_U$ is the data rate of one user, and U is the number of users. With a two-fold increase in system capacity, while keeping $B_U$ constant, U could double, or $B_U$ could double keeping U constant, or both could increase less than two-fold.

BRIEF DESCRIPTION OF THE DRAWINGS

FIG. 3b is a block diagram of the modulator within the transmitter of FIG. 3a;

FIG. 5b is a block diagram of the demodulator within the receiver of FIG. 5a.

DETAILED DESCRIPTION OF THE INVENTION

Figure 1A:
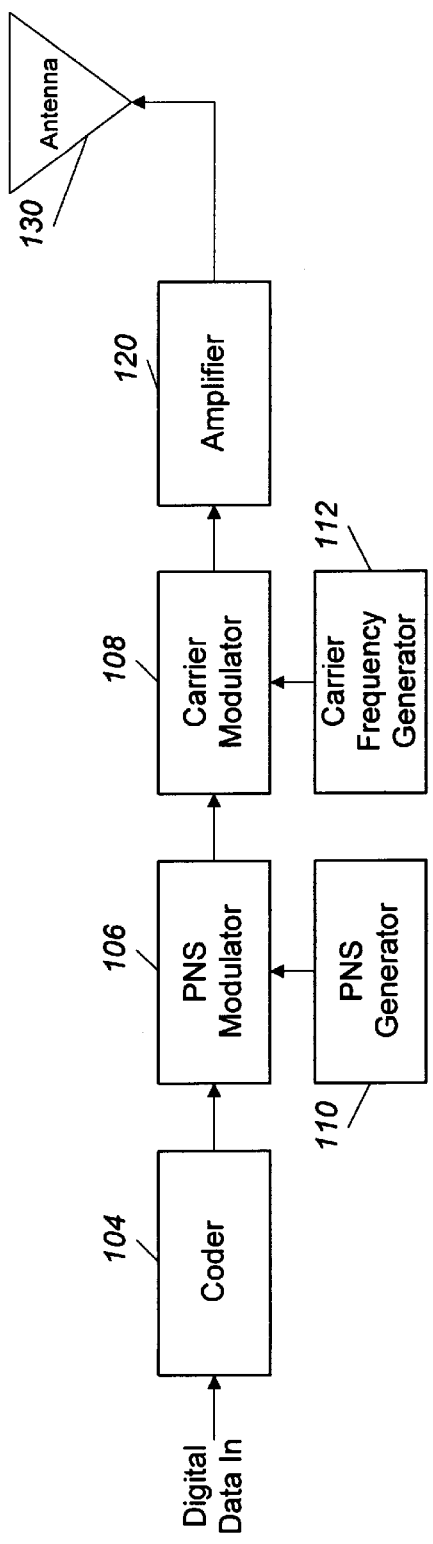
FIG. 1a is a block diagram of a prior art spread spectrum transmitter.
Figure 1B:
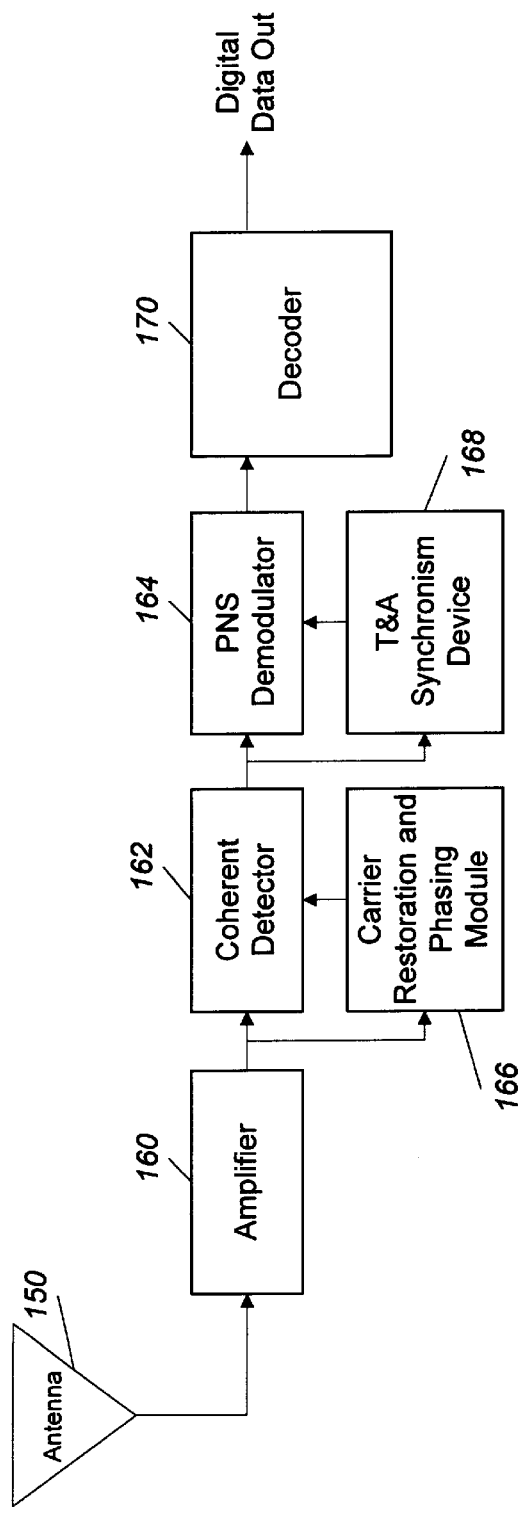
FIG. 1b is a block diagram of a prior art spread spectrum receiver.
Figure 2A:
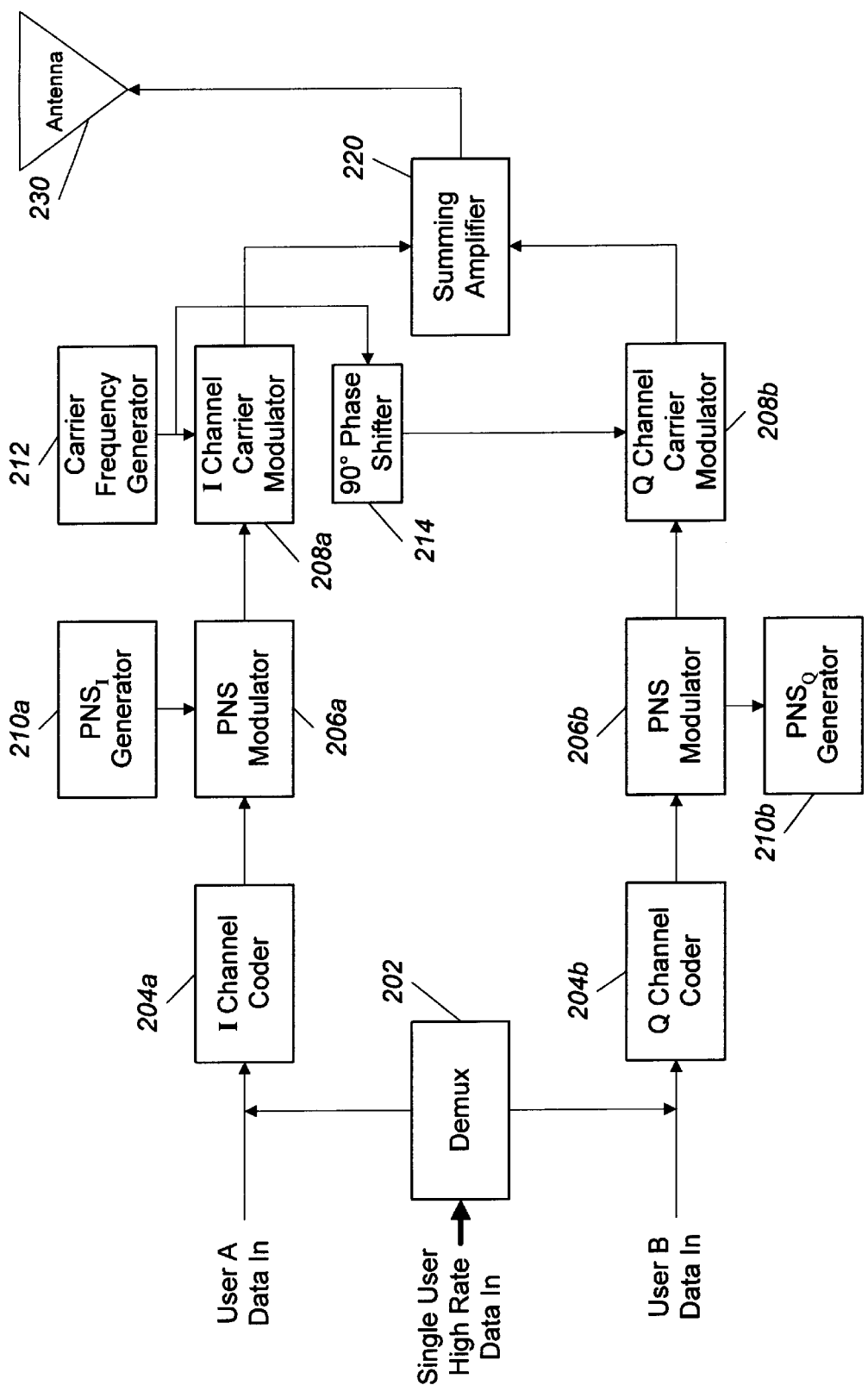
FIG. 2a is a block diagram of a second prior art spread spectrum transmitter.
Figure 2B:
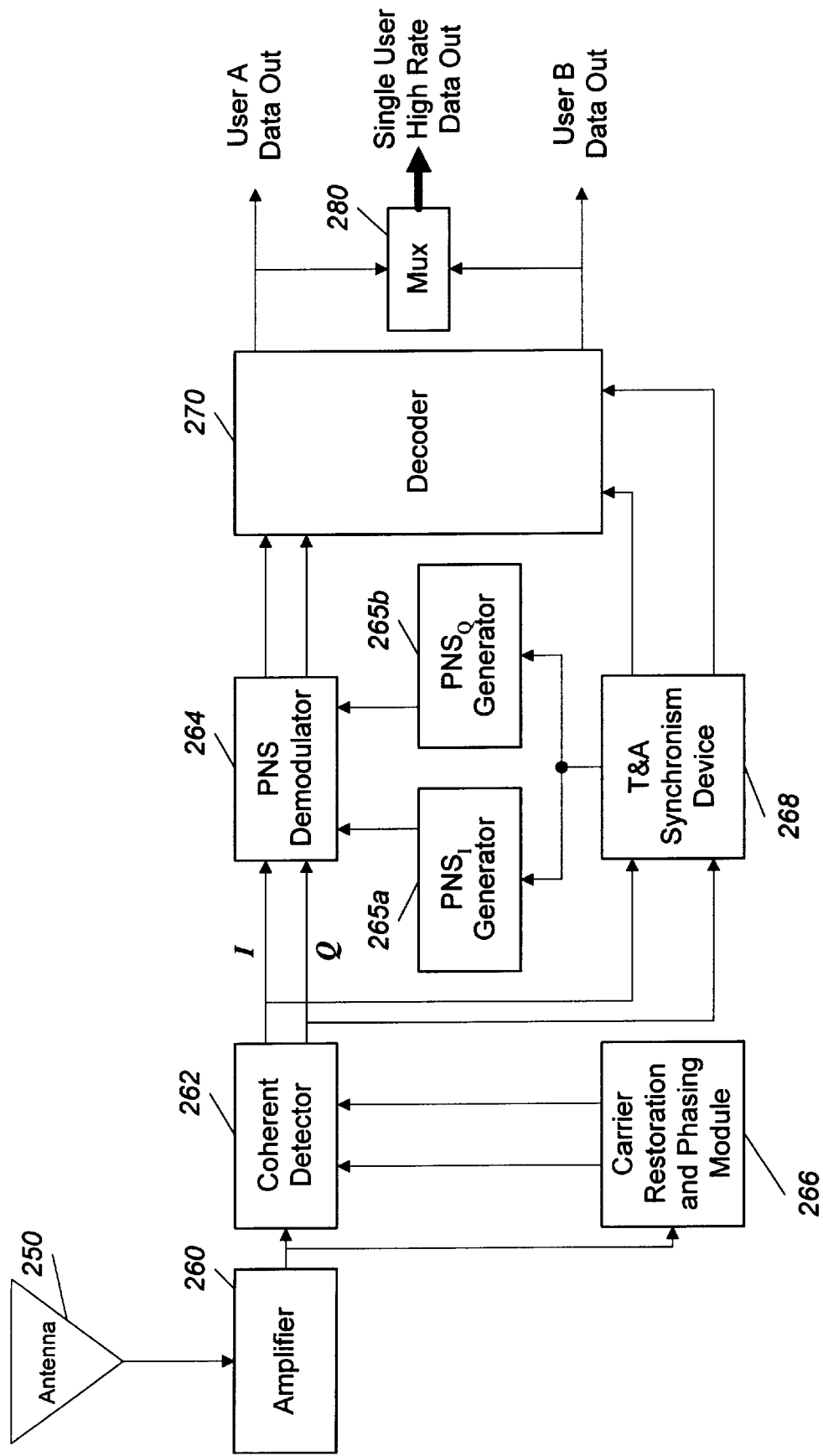
FIG. 2b is a block diagram of a second prior art spread spectrum receiver.
Figure 2C:
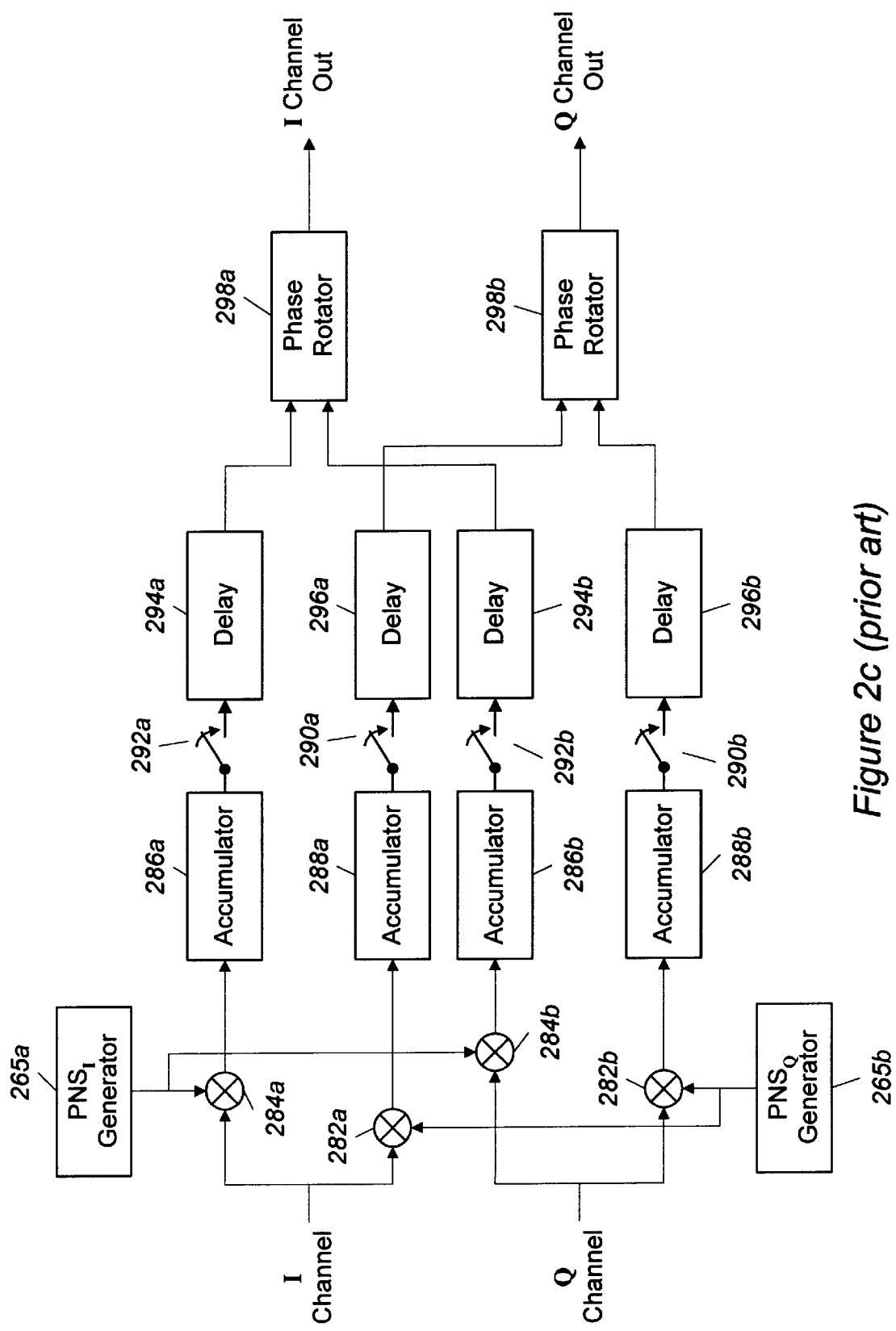
FIG. 2c is a detailed block diagram of the PNS demodulator in FIG. 2b.
Figure 3A:
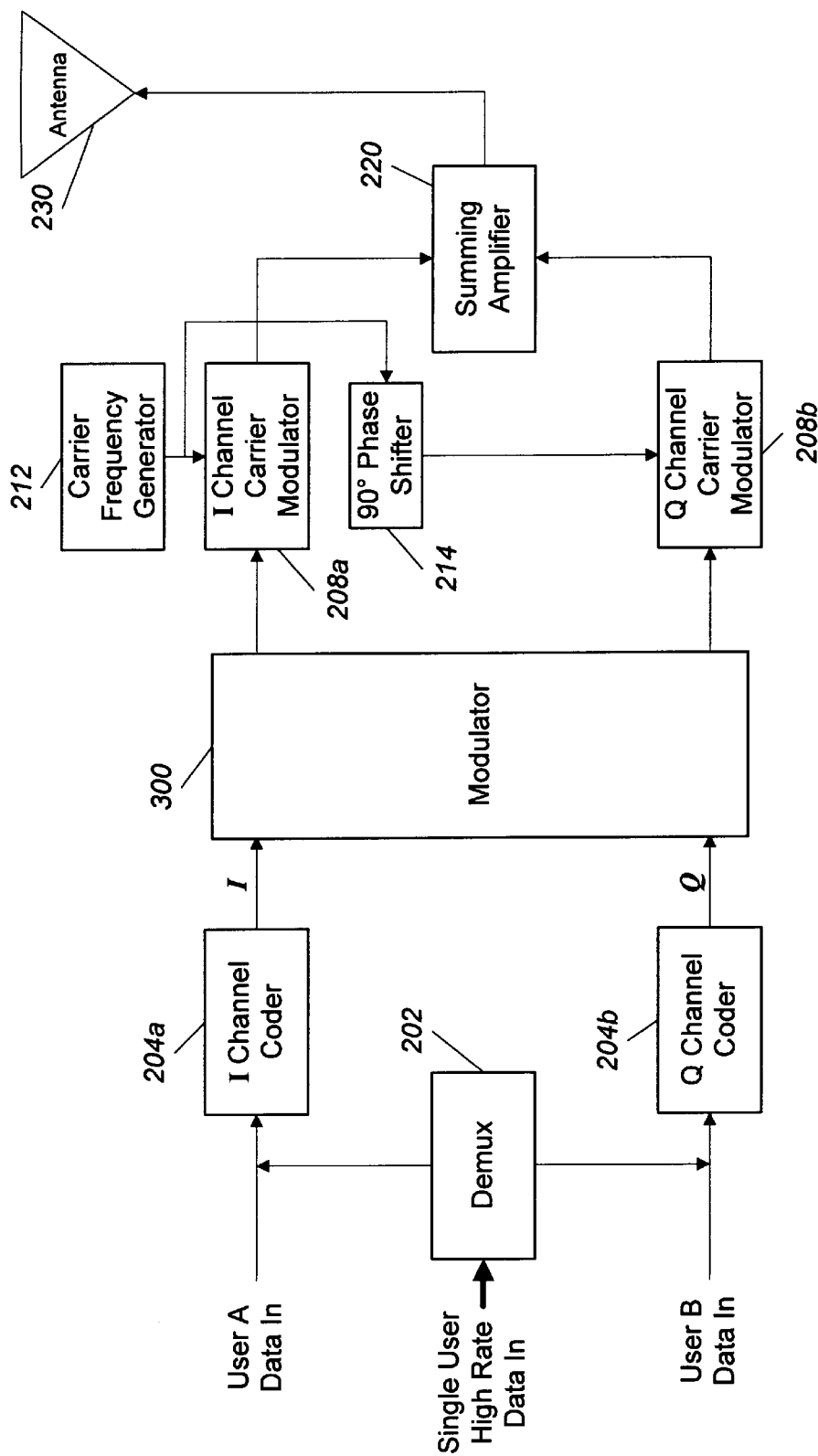
FIG. 3a is a block diagram of the transmitter of the improved spread spectrum system.

FIG. 3a is a block diagram of the improved transmitter in accordance with the present invention. In place of $PNS_I$ and PNS$_Q$ generators 210a and 210b and PNS modulators 206a and 206b is modulator 300, which can more specifically be used as an encoder or a spreader. Thus, although pictured in FIG. 3a between channel coders 204a and 204b and channel carrier modulators 208a and 208b, modulator 300 could be used as an encoder and thus be used in place of channel coders 204a and 204b. In addition, modulator 300 could be placed after channel carrier modulators 208a and 208b as a spreader because the spreading function can be performed either before carrier modulation or after it. As shown in FIG. 3a, it is preferable to use modulator 300 as a spreader and locate it after channel coders 204a and 204b.

Figure 3B:
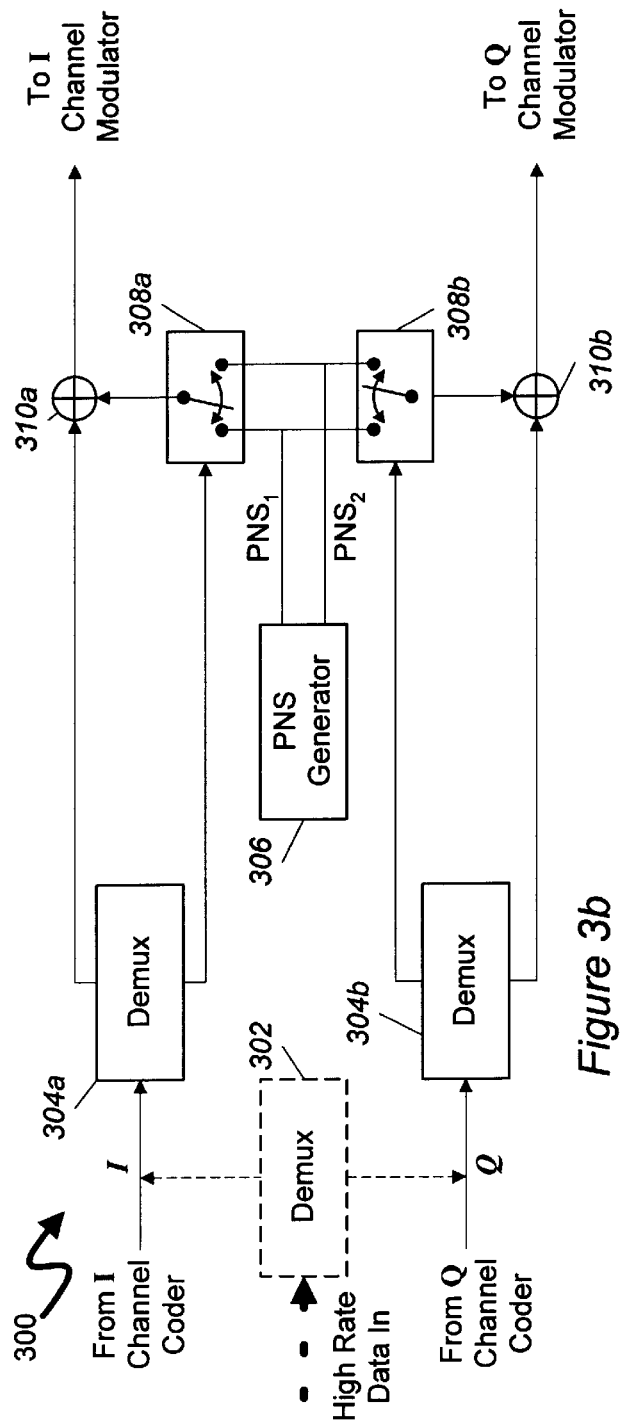

FIG. 3b is a block diagram of the modulator within the transmitter of FIG. 3a. Modulator 300 operates on both the I and Q channels. Each channel includes a demultiplexer 304, a switch 308, and a modulo-2 adder 310 (also called an exclusive-OR gate). Modulator 300 also includes PNS generator 306 that generates two orthogonal PN sequences.

Digital data, at bit rate B, is provided on both I and Q channels from channel coders 204a and 204b, each channel representing a user. The typical number of users provided for in this system is an even number (i.e. divisible by 2). The maximum number of users depends on the frequency bandwidth ΔF. However, there could be an odd number of users if a higher bit rate is chosen keeping ΔF constant. In FIG. 3b, this is represented as one channel operating at rate 2B provided to modulator 300. In such a case, the data is separated using demultiplexer 302 into two data streams each operating at B. It can be seen that in such a case, demultiplexer 302 takes the place of demultiplexer 202 in FIG. 3a and channel coders 204a and 204b would be replaced by one high speed channel coder (not shown) placed before demultiplexer 302.

The choice of data rate B is not critical, although it must conform to the main requirement of spread spectrum systems in which the bandwidth of the system must be much higher than that of the data rate, i.e. ΔF>>B. Typical data rates can be 32, 64, 80, 160, 320, 640, or 1280 kb/s, none of which is more preferable than another.

The two PN sequences can be generated by any known method, the most common of which uses a shift register. See, e.g., S. W. Golomb, *Shift Register Sequences* (Aegean Park Press 1982) or R. C. Dixon, *Spread Spectrum Systems with Commercial Applications* (Wiley 1994). Each PN sequence can be any length divisible by four in order to preserve orthogonality. The length M of a PNS period is related to the bandwidth ΔF and bit rate B by ΔF=B·M. In order to preserve processing gain, ΔF>>B, M should be at least 32 and possibly 64. On the high side, selection of M is limited by the acquisition time in the receiver, so it is preferable not to select M too large. The chip rate is generally equal to ΔF and is thus approximately B·M. The chip rate can be very high (>1 GHz), however it is preferable to use one that is a power of two because it is easier to produce those rates (i.e. 512, 1024, 2048, 4096, 8192 kHz).

Figure 3C:
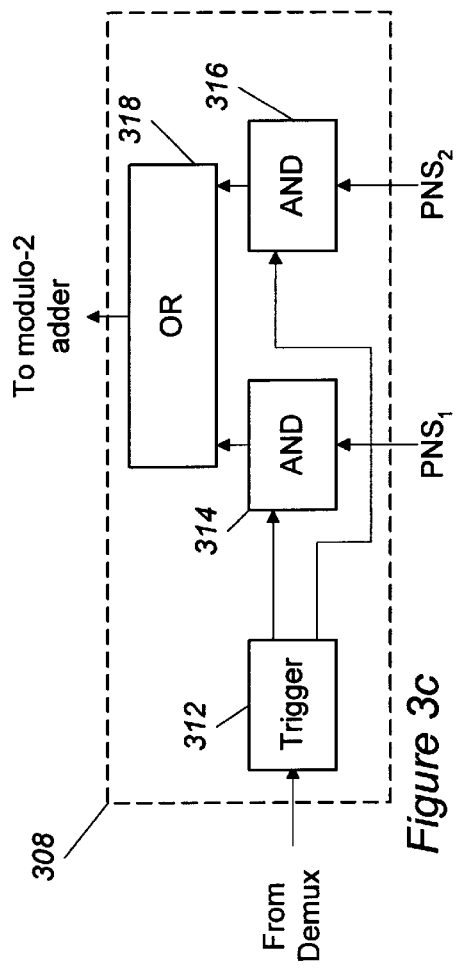
FIG. 3c is a block diagram of the switch within the spreader of FIG. 3b.

Modulator 300 operates as follows, considering the I-channel as exemplary (the Q-channel operates the same way). Data is provided at bit rate B to demultiplexer 304a in which it is separated into two data signals operating at rate B/2. One data signal is provided to the trigger of switch 308a and the other signal is provided to modulo-2 adder 310a. The two PN sequences, PNS$_1$ and PNS$_2$ are provided as inputs to switch 308a. Switch 308a is further described in FIG. 3c. The switch includes trigger 312, two AND gates 314 and 316, and OR gate 318. Trigger 312 operates like a flip-flop in which one of the trigger's outputs follows the input and the other output provides the inverse of the input. Thus, if the trigger signal from demultiplexer 304 is 1, the top output from trigger 312 will be 1 and PNS$_1$ will be transmitted to the switch output. Conversely, if the trigger signal is 0, the bottom output from trigger 312 will be 1 allowing PNS$_2$ to be transmitted to the switch output. Because adder 310a adds by modulo-2, if the input from the demultiplexer to adder 310a is a 0, the adder will output the PNS, and if the demultiplexer output is a 1, the adder will output the inverse of the PNS. The chip rate of the modulated output from modulator 300 is $$\frac{B}{2} \cdot M.$$

Figure 4:
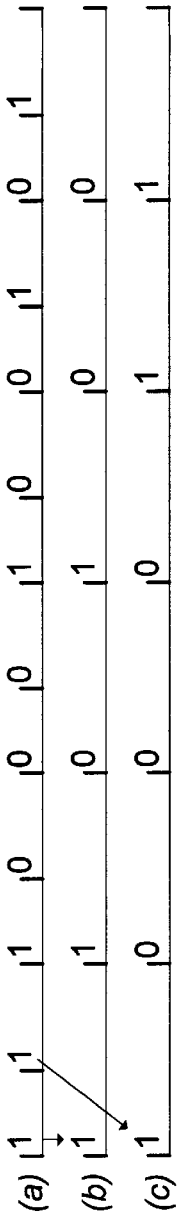
FIG. 4 is a timing diagram of the bits within the modulator.

FIG. 4 is a timing diagram of the bits at different places within modulator 300. FIG. 4(a) shows the data signal at the input to demultiplexer 304a operating at bit rate B. FIG. 4(b) shows the odd bits output from demultiplexer 304a at bit rate B/2 and provided to modulo-2 adder 310a. FIG. 4(c) shows the even bits output from demultiplexer 304a at bit rate B/2 and provided to switch 308a as the trigger signal. FIGS. 4(d) and 4(e) show PNS$_1$ and PNS$_2$, respectively, provided by PNS generator 306. For ease of illustration, consider PN sequence periods of length 8 bits, i.e. M=8. PNS$_1$ is a 7-bit Barker sequence with an added 0, i.e. 11100100, and PNS$_2$ is the 7-bit Barker sequence used in PNS$_1$ shifted four bits with an added 0, i.e. 00101110. Both PN sequences operate at rate $$\frac{B}{2} \cdot M = \frac{B}{2} \cdot 8 = 4B.$$

FIG. 4(f) shows the output from switch 308a given the trigger signal of FIG. 4(c). The switch output operates at bit rate 4B. When the trigger signal is 1, switch 308a outputs PNS$_1$; when the trigger signal is 0, switch 308a outputs PNS$_2$. FIG. 4(g) shows the channel output at bit rate 4B. When the signal in FIG. 4(b) is a 1, modulo-2 adder 310a outputs the inverse of the PN sequence at its input; when the signal in FIG. 4(b) is a 0, modulo-2 adder 310a outputs the PN sequence at its input.

Figure 5A:
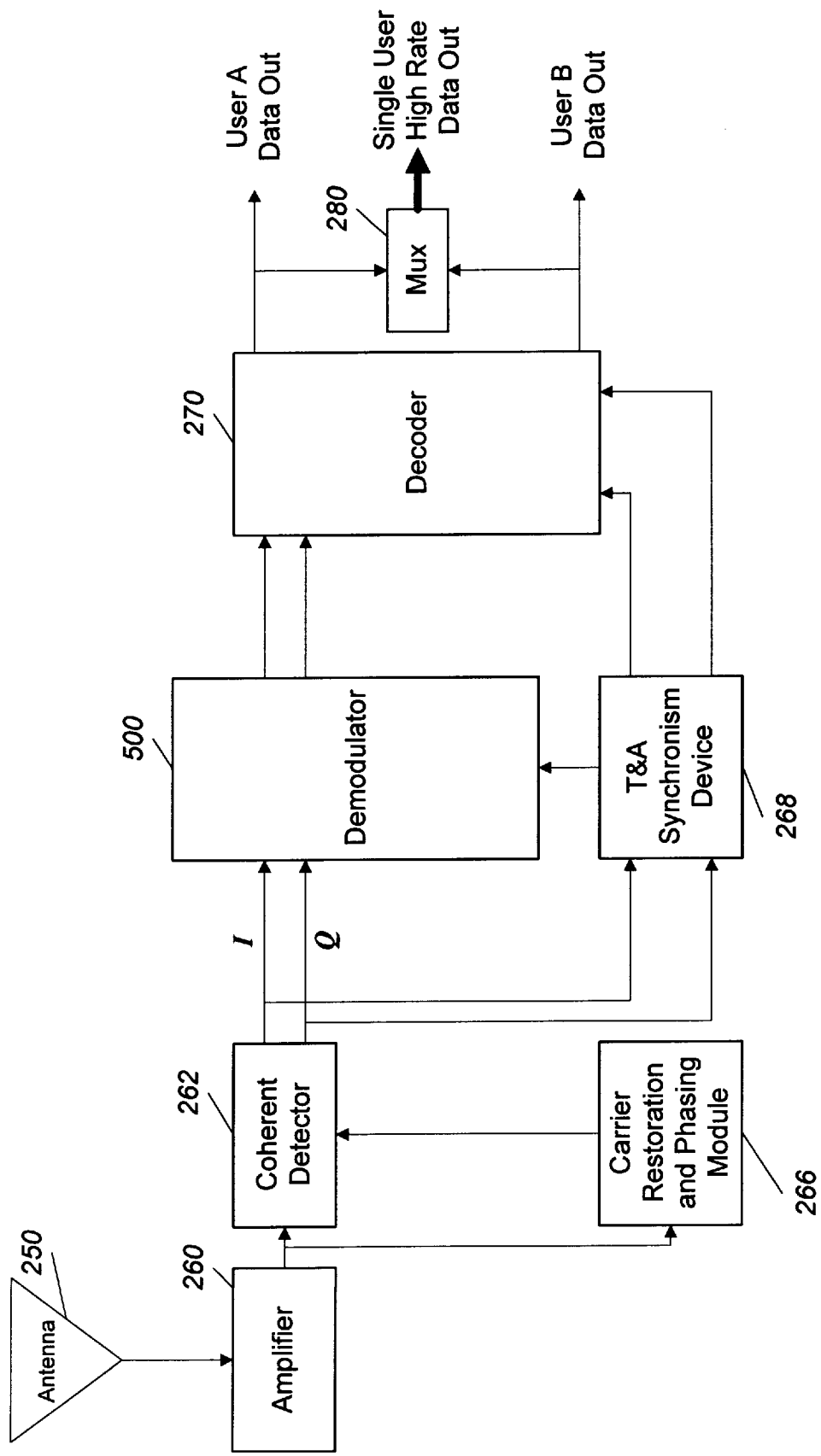
FIG. 5a is a block diagram of the receiver of the improved spread spectrum system.

FIG. 5a is a block diagram of the improved receiver in accordance with the present invention. In place of PNS$_I$ and PNS$_Q$ generators 265a and 265b and PNS demodulator 264 is demodulator 500, which can more specifically be used as a despreader or a decoder. Thus, although pictured in FIG. 5a between coherent detector 262 and decoder 270, demodulator 500 could be used as a decoder and thus partially be used in place of decoder 270. (As a decoder, demodulator 500 could not fully replace decoder 270 because the latter includes clock extraction circuitry and frame synchronization circuitry that demodulator 500 does not include.) In addition, demodulator 500 (along with T&A synchronism device 268) can be placed before coherent detector 262 (and carrier restoration and phasing module 266) and used as a despreader because the despreading function can be performed either before coherent detection or after it. As shown in FIG. 5a, it is preferable to use demodulator 500 as a despreader and locate it after coherent detector 262.

Figure 5B:
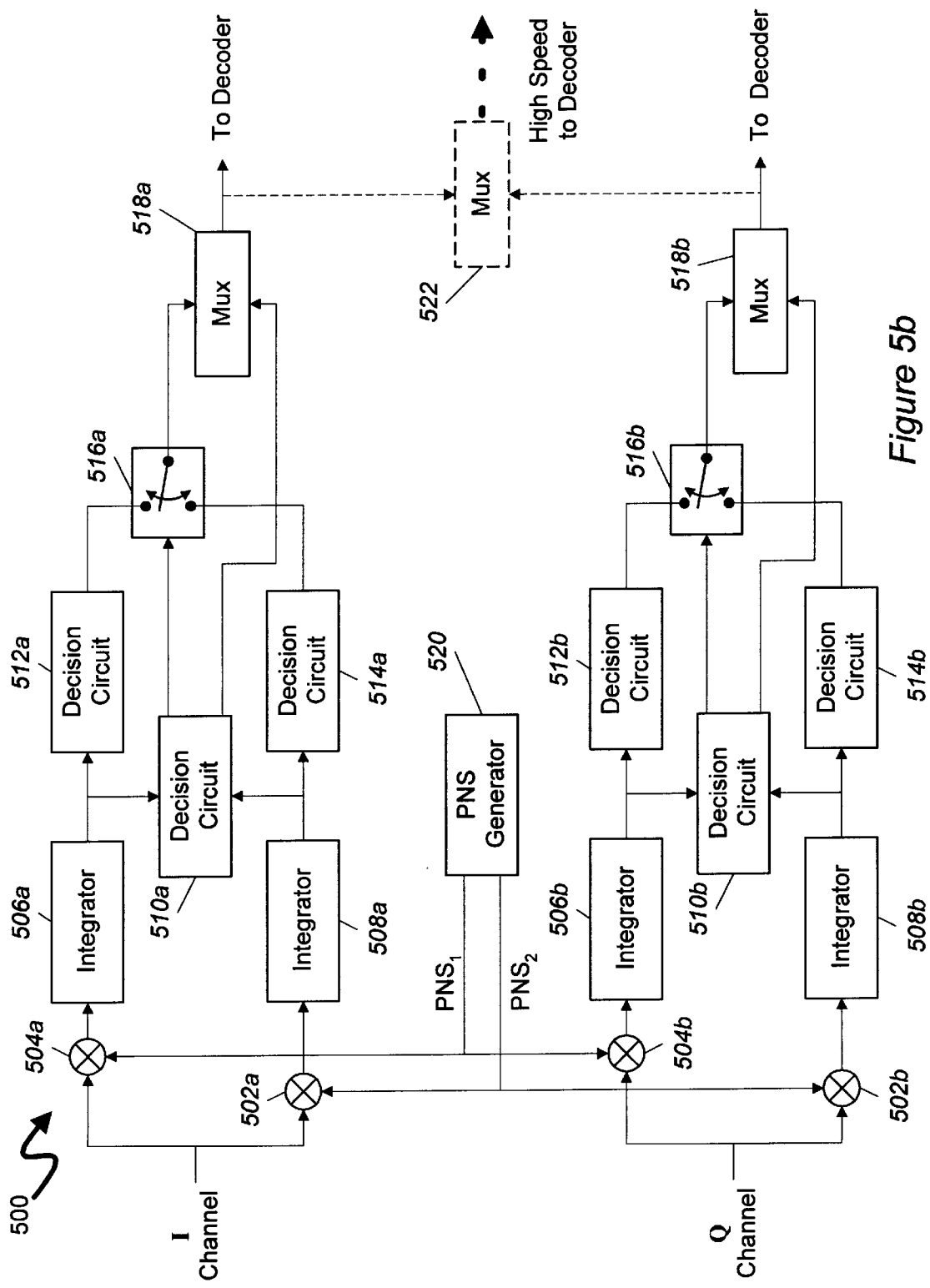

FIG. 5b is a block diagram of the demodulator within the receiver of FIG. 5a. It is assumed that T&A synchronism device 268 synchronizes in a conventional manner PNS generator 520 and controls the decision circuits and multiplexers in demodulator 500. Demodulator 500 operates on both the I and Q channels, each channel being split into subchannels. Each channel includes multipliers 502 and 504, integrators 506 and 508, channel decision circuit 510, subchannel decision circuits 512 and 514, switch 516, and multiplexer 518. Demodulator 500 also includes PNS generator 520 that generates replicas of the two orthogonal PN sequences used in modulator 300.

Digital data, at bit rate $$\frac{B}{2} \cdot M,$$

is provided on both I and Q channels from coherent detector 262. Using channel I as exemplary, the data in I channel is split into upper and lower subchannels. In the upper subchannel, the data is multiplied in multiplier 504a by $PNS_1$, and the product is provided to integrator 506a. Similarly, in the lower subchannel, the data is multiplied by $PNS_2$ in multiplier 502a, and the product is provided to integrator 508a. Integrators 506a and 508a integrate over one PNS period (M bits). Subchannel decision circuits 512a and 514a determine whether the integrated output is a 0 or a 1 and provide those bits to switch 516a. Channel decision circuit 510a decides which subchannel has the largest integrated output magnitude (absolute value). This decision determines that the PNS contributing to the larger integrated value was the one that was used in modulator 300. Channel decision circuit 510a has two outputs. One output provides a control signal corresponding to the PNS that contributed to the larger integrated value. The other output provides a signal to the trigger of switch 516a to output the bit from the subchannel decision circuit corresponding to larger integrated value. For example, if the value from integrator 508a is greater than the value from integrator 506a, channel decision circuit 510a determines that $PNS_2$ modulated that bit, and channel decision circuit 510a provides a 0 to one input of multiplexer 518a. The trigger output from channel decision circuit 510a directs switch 516a to output the bit from subchannel decision circuit 514a and provide it to the second input of multiplexer 518a. The inputs to multiplexer 518a operate at bit rate B/2. Multiplexer 518a combines the two inputs into one data signal operating at bit rate B.

The Q channel works analogously, and multiplexer 518b provides a data signal also operating at bit rate B. If two user data signals at bit rate B had been transmitted in FIG. 3a, the two outputs from demodulator 500 are provided to decoder 270 for further demodulation. If only one high speed data signal at bit rate 2B had been transmitted in FIG. 3a, two scenarios exist for combining the two outputs of demodulator 500. In the first scenario, the outputs of multiplexers 518a and 518b can be further combined in multiplexer 522 to form one data signal at bit rate 2B, and decoder 270 would only operate on that data signal. In that case, multiplexer 280 in FIG. 5a is no longer needed. In the second scenario, demodulator 500 can still provide two data signals to decoder 270 and the outputs from that module can be combined in multiplexer 280 instead.

Figure 6:
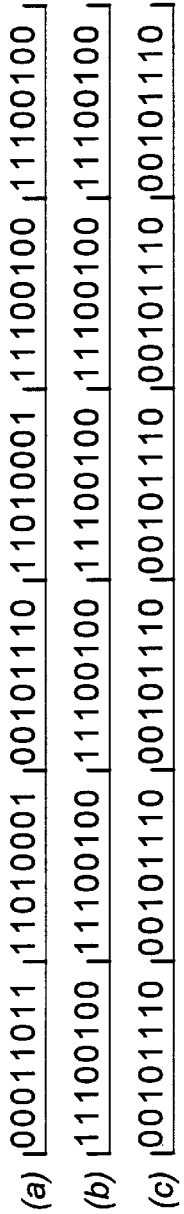
FIG. 6 is a timing diagram of the bits within the demodulator.

FIG. 6 is a timing diagram of the bits at different places within demodulator 500. FIG. 6(a) shows the data signal at the input to multipliers 502 and 504 operating at bit rate $$\frac{B}{2} \cdot M = \frac{B}{2} \cdot 8 = 4B.$$

(This is the same waveform as in FIG. 4(g).) FIGS. 6(b) and 6(c) show $PNS_1$ and $PNS_2$, respectively, provided by PNS generator 520. These are the same waveforms as in FIGS. 4(d) and 4(e), respectively. FIGS. 6(d) and 6(e) show the outputs from integrators 506a and 508a, respectively. These values were derived from multiplying bit-by-bit the waveform in FIG. 6(a) with the appropriate PNS. When the bits were different, the multiplier produced +1; when the bits were the same, the multiplier produced −1. The integrators added up all eight bits. For the first data bit, the subchannel corresponding to $PNS_1$ produced the greater integrated output. Thus, the waveform in FIG. 6(f), showing the control signal from channel decision circuit 510a, records a 1 corresponding to $PNS_1$. Likewise, when the subchannel corresponding to $PNS_2$ produces the larger integrated result, the waveform in FIG. 6(f) records a 0. The waveform in FIG. 6(f) operates at B/2. Note that the comparison in channel decision circuit 510a is based on the absolute value of the integrated outputs. The sign of the integrated outputs comes into play in FIG. 6(g). This waveform corresponds to the value of the bit produced by the decision circuit of the subchannel corresponding to the larger integrated value. If the sign is positive, the bit produced is a 1; if the sign is negative, the bit produced is a 0. The waveform in FIG. 6(g) also operates at B/2. Finally, the two waveforms in FIGS. 6(f) and 6(g) are combined in multiplexer 518, FIG. 6(f) constituting the even bits and FIG. 6(g) constituting the odd bits in the multiplexed output. The resulting signal in FIG. 6(h) operates at bit rate B and is the same signal as the input waveform in FIG. 4(a).

An advantage of the present invention is that it is well adapted for group users and ISDN services. As an example, assume there are four subscribers and that each subscriber operates at a data rate of B+D=64+16=80 kb/sec. These four subscribers are connected directly to switches 308a and 308b and to modulo-2 adders 310a and 310b in FIG. 3b (i.e. directly to the output of demultiplexers 304a and 304b), and are synchronized with each other. The total transmission data rate equals 4·80=320 kb/sec, and the signal base D equals 64. Thus, ΔF=D·B=64·80 kb/sec=5120 kHz~5 MHz. A group signal having the same data rate (320 kb/sec) can be provided at the input to demultiplexer 302. The group signal for that number of subscribers remains constant, simplifying construction of a transmitting radio highway. If the number of subscribers is reduced, the block diagram will remain unchanged and only the inputs of the non-operating subscribers will be cut off. The peak factor of the radio signal will still equal 1. At the receiver in FIG. 5b, each subscriber, from switches 516a and 516b and decision circuits 510a and 510b (the inputs to multiplexers 518a and 518b), outputs at a rate of 80 kb/sec, and the group output from multiplexer 522 operates at 320 kb/sec. By using OCDMA, N=D/2=64/2=32 subscriber stations of this kind can be arranged. Thus the spectral efficiency is $$\gamma = \frac{32 \cdot 320 \text{ kb/sec}}{5120 \text{ kHz}} = 2 \text{ bit/sec/Hz}.$$

In the case where the number of subscribers in a group is higher than four, for example, eight or nine, it may be practical to allocate a common signaling channel operating at 64 kb/sec. This produces a group data rate of 9·64+1·64= 640 kb/sec which can be provided to demultiplexer 302 in FIG. 3b. Using the same signal base D=64, the chip frequency equals 160 kb/sec·64=10240 kb/sec. In this case, only the operating data rates of the elements are doubled, but this does not change either the block diagrams of the modulator and demodulator or the principle of operation.

While several embodiments have been illustrated and described, other variations and alternate embodiments will occur to those skilled in the art. These variations and embodiments remain within the spirit and scope of this invention.

We claim:

1. A system for encoding an input data signal having a nominal data bit rate into an encoded data signal and for decoding such an encoded data signal comprising:

encoding apparatus comprising:
- a demultiplexer responsive to said input data signal and providing first and second half data signals at half said nominal data bit rate,
- a pseudorandom noise (PN) sequence generator providing first and second orthogonal PN sequences,
- a modulo-2 adder having a first input receiving said first half data signal and a second input and providing an output, and
- a switch responsive to said second half data signal for providing either said first or said second PN sequence to said second input of said modulo-2 adder, and decoding apparatus comprising:
- a PN sequence generator generating a first PN sequence and a second PN sequence, said PN sequences being orthogonal to each other,
- first and second multipliers for multiplying said encoded data signal with said first and second PN sequences, respectively,
- first and second integrators for integrating the outputs of said first and second multipliers respectively,
- first and second decision circuits for respectively deciding whether the output of said first and second integrators is a high or a low bit,
- a third decision circuit for comparing the outputs of said first and second integrators, and providing first and second decision signals,
- a switch having a trigger input, first and second inputs, and an output, said first and second inputs respectively being provided by said first and second decision circuits, the trigger input being provided by said first decision signal, and
- a first multiplexer having first and second inputs and an output, said first input being provided by said switch output, said second input being provided by said second decision signal, said first and second inputs operating at a half a predefined nominal data rate, and said multiplexer output operating at the nominal data rate.

2. An apparatus for encoding an input data signal having a nominal data bit rate comprising:
- a demultiplexer responsive to said input data signal and providing first and second half data signals at half said nominal data bit rate;
- a pseudorandom noise (PN) sequence generator providing first and second orthogonal PN sequences;
- a modulo-2 adder having a first input receiving said first half data signal and a second input and providing an output; and
- a switch responsive to said second half data signal for providing either said first or said second PN sequence to said second input of said modulo-2 adder.

3. A dual-channel data transmission apparatus comprising first and second encoding apparatus as specified in claim 2.

4. A transmitter comprising a dual-channel transmission apparatus as specified in claim 3 and further comprising means for modulating quadrature carriers with the output signals from both modulo-2 adders of said first and second encoding apparatus.

5. A dual-channel data transmission apparatus as specified in claim 3 further comprising an input demultiplexer responsive to a supplied signal having twice said nominal data bit rate for providing input data signals at said nominal data bit rate to said first and second encoding apparatus.

6. An apparatus for decoding a received spread spectrum data signal comprising:
- a pseudorandom noise (PN) sequence generator generating a first PN sequence and a second PN sequence, said PN sequences being orthogonal to each other;
- first and second multipliers for multiplying said received spread spectrum signal with said first and second PN sequences, respectively;
- first and second integrators for integrating the outputs of said first and second multipliers, respectively;
- first and second decision circuits for respectively deciding whether the output of said first and second integrators is a high or a low bit;
- a third decision circuit for comparing the outputs of said first and second integrators, and providing first and second decision signals;
- a switch having a trigger input, first and second inputs, and one output, said first and second inputs respectively being provided by the outputs of said first and second decision circuits, the trigger input provided by said first decision signal; and
- a first multiplexer having first and second inputs and one output, said first input being provided by said switch output, said second input being provided by said second decision signal, said first and second inputs operating at a half a predefined nominal data rate, and said multiplexer output operating at the nominal data rate.

7. A dual-channel demodulator comprising first and second decoding apparatus as specified in claim 6 having a common PN sequence generator and providing first and second multiplexer output signals operating at said nominal data rate.

8. A dual-channel receiver comprising a coherent detector for detecting modulated in-phase and quadrature-phase signals and the dual-channel demodulator of claim 7.

9. A demodulator in a spread spectrum receiver providing data at a predefined nominal data rate, said demodulator generating first and second orthogonal pseudorandom noise (PN) sequences and having two channels, each channel processing a data signal and each channel having first and second subchannels, each subchannel having a multiplier and an integrator, said first subchannel multiplier multiplying said first PN sequence with said data signal and integrating said result, said second subchannel multiplier multiplying said second PN sequence with said data signal and integrating said result, the improvement wherein a channel decision circuit compares the integrator results from said first and second subchannels and provides a trigger signal to a switch and a control signal to a multiplexer based on which integrator result has a greater magnitude, and first and second subchannel decision circuits determine whether said integrated result is high or low and provide said high or low data bits to said switch which provides the high or low bit from the subchannel decision circuit determined by said trigger signal, said high or low bit multiplexed with said control signal and the combined signal output at said nominal data rate.

10. A method for modulating a spread spectrum data signal transmitted at a predefined nominal data rate, comprising the steps of:
- generating first and second pseudorandom noise (PN) sequences, said PN sequences being orthogonal to each other;

demultiplexing said data signal into first and second signals operating at half the nominal data rate;

selecting said first or second PN sequence based on the value of said first demultiplexed signal; and modulo-2 adding said second demultiplexed signal and said selected first or second PN sequence and outputting the modulo-2 sum.

11. A method for demodulating a spread spectrum data signal, comprising the steps of:

generating first and second pseudorandom noise (PN) sequences, said PN sequences being orthogonal to each other;

splitting said data signal into first and second subchannel signals;

multiplying said first and second subchannel signals with said first and second PN sequences, respectively;

integrating the results of said multiplications;

comparing the results of said integrations to generate a select signal;

deciding in each subchannel whether that subchannel's integration result was due to a high or a low bit;

selecting a subchannel output signal in accordance with said select signal; and multiplexing said selected subchannel output signal and said select signal.

* * * * *